(12) United States Patent
Fox et al.

(10) Patent No.: US 9,915,945 B2
(45) Date of Patent: Mar. 13, 2018

(54) LOST PERSON RESCUE DRONE

(71) Applicant: International Business Machines Corporation, Armonk, NY (US)

(72) Inventors: Jeremy R. Fox, Georgetown, TX (US); Andrew R. Jones, Round Rock, TX (US); Norman Tsu-Han Liu, Austin, TX (US); Balasubramanian Sivasubramanian, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/228,391

(22) Filed: Aug. 4, 2016

(65) Prior Publication Data

US 2018/0039262 A1    Feb. 8, 2018

(51) Int. Cl.
| | |
|---|---|
| *G05D 1/00* | (2006.01) |
| *G08G 5/00* | (2006.01) |
| *B64C 39/02* | (2006.01) |
| *G01S 19/17* | (2010.01) |
| *H04W 4/02* | (2018.01) |

(Continued)

(52) U.S. Cl.
CPC .......... *G05D 1/0011* (2013.01); *B64C 39/024* (2013.01); *G01S 19/17* (2013.01);
(Continued)

(58) Field of Classification Search
CPC .. G05D 1/0011; G05D 1/0088; B64C 39/024; B64C 2201/12; B64C 2201/122;
(Continued)

(56) References Cited

U.S. PATENT DOCUMENTS

| | | | |
|---|---|---|---|
| 7,755,496 B1* | 7/2010 | Bernstein | B63C 9/00 |
| | | | 340/573.1 |
| 8,909,391 B1* | 12/2014 | Peeters | G05D 1/0027 |
| | | | 701/2 |

(Continued)

FOREIGN PATENT DOCUMENTS

WO    2014080387 A2    5/2014

OTHER PUBLICATIONS

Mukherjee et al., Unmanned Aerial System for Post Disaster Identification, 2014, IEEE, p. 347-252.*

(Continued)

*Primary Examiner* — McDieunel Marc
(74) *Attorney, Agent, or Firm* — Scully, Scott, Murphy & Presser, P.C.; Michael Petrocelli, Esq.

(57) ABSTRACT

A system and method for optimizing a rescue operation of an individual. The method comprises maintaining, by an individual engaged in an activity, an unmanned aerial vehicle (UAV) associated with and in proximity to the individual. For storage at the UAV, the individual records at a recording device a message. A sensor device is configured to detect a situation requiring a need to rescue the individual at a current location, and generates a trigger signal in response to a detection. In response to the receipt of the trigger signal, a current GPS location of the individual is recorded and a launching of the UAV to traverse a flight-path to a destination location. At or before arriving at the destination location, the UAV contemporaneously provides the stored recorded message and current GPS location of the individual to an emergency response authority to inform of the individual's situation and location.

18 Claims, 5 Drawing Sheets

(51) Int. Cl.
    *H04B 7/185*    (2006.01)
    *A62B 99/00*    (2009.01)
(52) U.S. Cl.
    CPC ......... *G05D 1/0088* (2013.01); *G08G 5/0056* (2013.01); *G08G 5/0069* (2013.01); *H04B 7/18506* (2013.01); *H04W 4/02* (2013.01); *A62B 99/00* (2013.01); *B64C 2201/12* (2013.01); *B64C 2201/122* (2013.01)
(58) Field of Classification Search
    CPC .... G01S 19/17; G08G 5/0056; G08G 5/0069; H04B 7/18506; H04W 4/02; A62B 99/00
    USPC ............................................................ 701/2
    See application file for complete search history.

(56) References Cited

U.S. PATENT DOCUMENTS

| | | | |
|---|---|---|---|
| 9,417,325 B1* | 8/2016 | Bry | G01S 13/9303 |
| 9,665,094 B1* | 5/2017 | Russell | G05D 1/00 |
| 9,665,913 B2* | 5/2017 | Loutit | G06Q 40/08 |
| 9,671,781 B1* | 6/2017 | Peeters | G05D 1/0011 |
| 2007/0131822 A1 | 6/2007 | Stallard | |
| 2007/0273871 A1 | 11/2007 | Galli | |
| 2010/0250022 A1 | 9/2010 | Hines et al. | |
| 2011/0208373 A1* | 8/2011 | Lees | B64C 39/024 701/2 |
| 2012/0064855 A1 | 3/2012 | Mendelson | |
| 2013/0311009 A1 | 11/2013 | McAndrew et al. | |
| 2014/0316243 A1 | 10/2014 | Niedermeyer | |
| 2015/0045063 A1 | 2/2015 | Mishra et al. | |
| 2015/0266577 A1 | 9/2015 | Jones et al. | |
| 2017/0088261 A1* | 3/2017 | Sequeira | B64C 39/024 |

OTHER PUBLICATIONS

Coleman et al., "Design of an Autonomous Platform for a Search and Rescue UAV Network", Worchester Polytechnic Institute, Apr. 26, 2012.

* cited by examiner

LOST PERSON RESCUE DRONE

FIELD

The present disclosure relates to rescue systems and devices, e.g., for finding lost individuals, and a system and method utilizing an unmanned aerial vehicle (UAV) or "drone" device to report lost individuals (hikers, skiers, etc.).

BACKGROUND

Remotely piloted UAV or "drones" have been used for various applications in both commercial and military contexts.

While commercial unmanned aerial vehicles including drones, unpiloted aerial vehicles, and remotely piloted aerial vehicles comprise a modern time alternative for tasks that pose a high risk for human life, there remains a need to utilize such technology to assist in the rescue of individuals or groups in situations such as being lost while hiking, skiing, or lost at sea, etc.

SUMMARY

A system and method available to assist in the rescue of individuals or groups using a drone based on the perspective of and at the initiation of the lost individual. The system, method and computer program product implement an aerial drone for assisting in the rescue of individuals or groups.

In accordance with one aspect, there is provided an automated drone programmed to launch upon a trigger from a user who is lost, or a trigger from some other source, such as a sensed or detected event, to automatically initiate a rescue operation.

In one embodiment, there is provided a drone based rescue system. the system comprises: comprising: an unmanned aerial vehicle (UAV) associated with and in proximity to the individual, the UAV comprising: one or more sensor devices configured to detect a situation requiring a need to rescue the individual at a current location, and generating a trigger signal upon the detecting; a recording device configured to record and store a message from an individual; a global positioning system (GPS) receiver for receiving GPS signals to determine a current GPS location of the individual; a navigation system configured to control the UAV to traverse a flight-path to a destination location; a processor unit at the UAV configured to receive the trigger signal and automatically record a current GPS location of the individual and controlling a launching of the UAV to the destination location, wherein the UAV is further configured to contemporaneously provide the stored recorded message and current GPS location of the individual to one or more playback devices associated with an emergency response authority to inform of the individual's situation and location.

In another embodiment, there is provided a method for optimizing a rescue operation of an individual engaged in an activity. The method comprises: maintaining, by an individual engaged in an activity, an unmanned aerial vehicle (UAV) associated with and in proximity to the individual, recording by a recording device at the UAV a message from an individual, and storing the message in a storage device for subsequent playback; detecting, at one or more sensor devices, a situation requiring a need to rescue the individual at a current location, and generating a trigger signal in response to the detecting, the UAV having a control processor unit configured to receive the trigger signal, determining, by a global positioning system (GPS) receiver adapted to receive GPS signals at the UAV to determine a current GPS location of the individual; wherein, responsive to receipt of the trigger signal, the control processor unit automatically recording a current GPS location of the individual and controlling a launching of the UAV to a destination location, the control processing unit controlling a navigating of the UAV to traverse a flight-path to the destination location, and contemporaneously providing the stored recorded message and current GPS location of the individual to one or more playback devices associated with an emergency response authority to inform of the individual's situation and location.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

A system, method and computer program product implementing an aerial "drone" for assisting in the rescue of individuals or groups. The drone may be a well-known "Quadcopter" and includes: one or more power takeoff engines and electronic fuel injection system engines for powering the UAV for flight which may include power generators on boards for controlling the speed of motors within the craft; a communications sub-system for receiving control and navigation information sufficient for navigating the UAV along a flight path.

Figure 1:
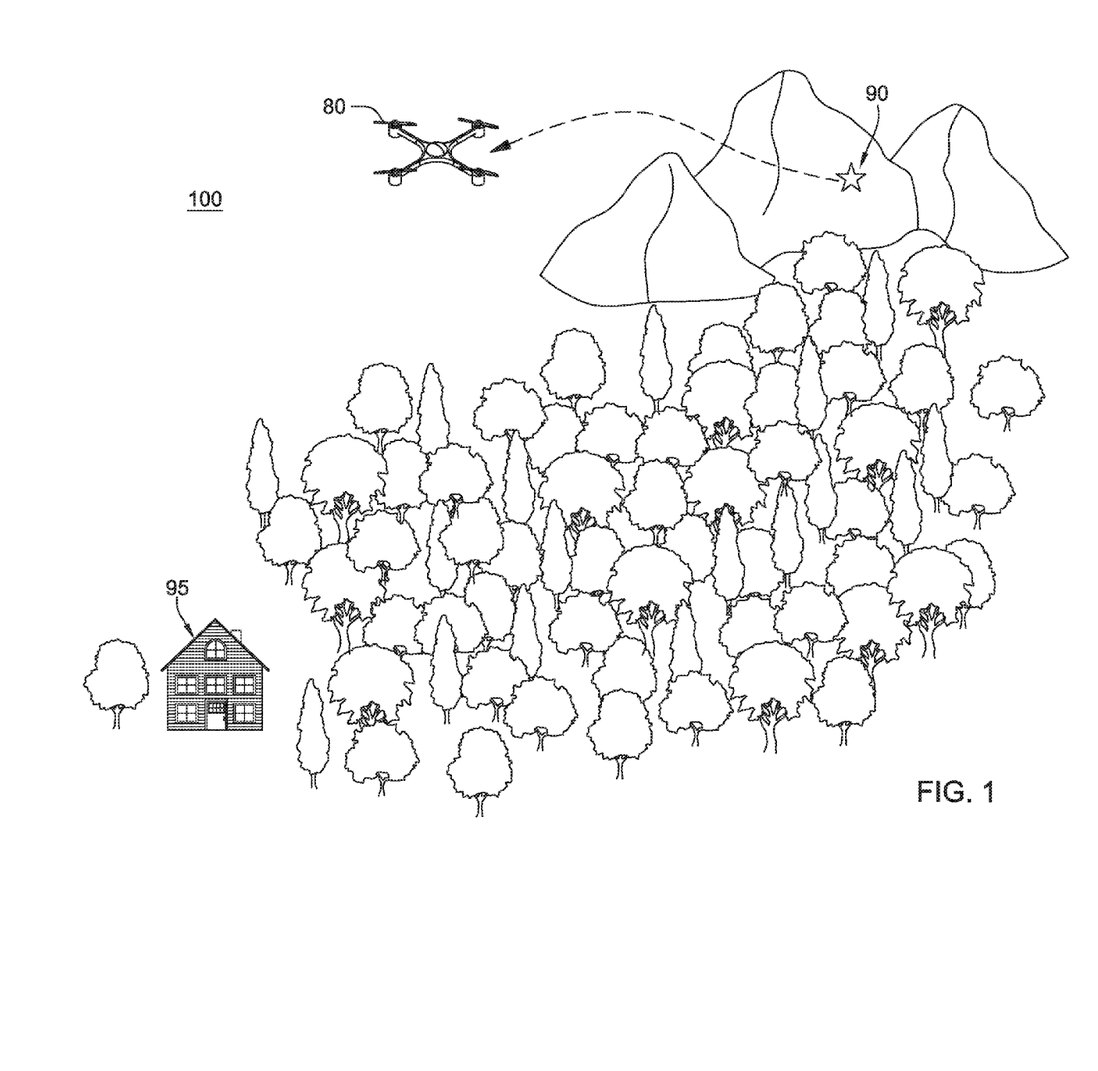
FIG. 1 conceptually show a lost person rescue drone system 100 implemented for assisting in a rescue of lost individuals.

FIG. 1 depicts a system diagram of an unmanned aerial vehicle 80 (interchangeably referred to herein as a "drone") equipped with devices and equipment to be used to operations to rescue of individuals or groups who are lost in various situations, e.g., while hiking, skiing, or boating, etc. For example, as shown in FIG. 1, in an example embodiment for rescuing a user lost in the mountains, a drone 80 is controlled to navigate and/or obtain help, such as from an emergency/rescue entity or authority 95.

In particular, FIG. 1 depicts an example operation of a drone based rescue system 100 in which an unmanned aerial vehicle (UAV) 80 is provided associated with and/or in proximity to an individual 90 engaging in an activity, e.g., hiking in the mountains, in an exemplary embodiment.

As shown in FIG. 1, the system 100 depicts a method for optimizing a rescue operation of an individual engaged in an activity in which that individual becomes lost, and such that only the lost individual knows he/she is lost. In the flow of the method, the individual carries the UAV or otherwise the UAV is maintained, by an individual engaged in an activity (boating, skiing, hiking, and the like, wherein the UAV is provisioned in proximity to said individual while engaging in the activity.

Figure 2:
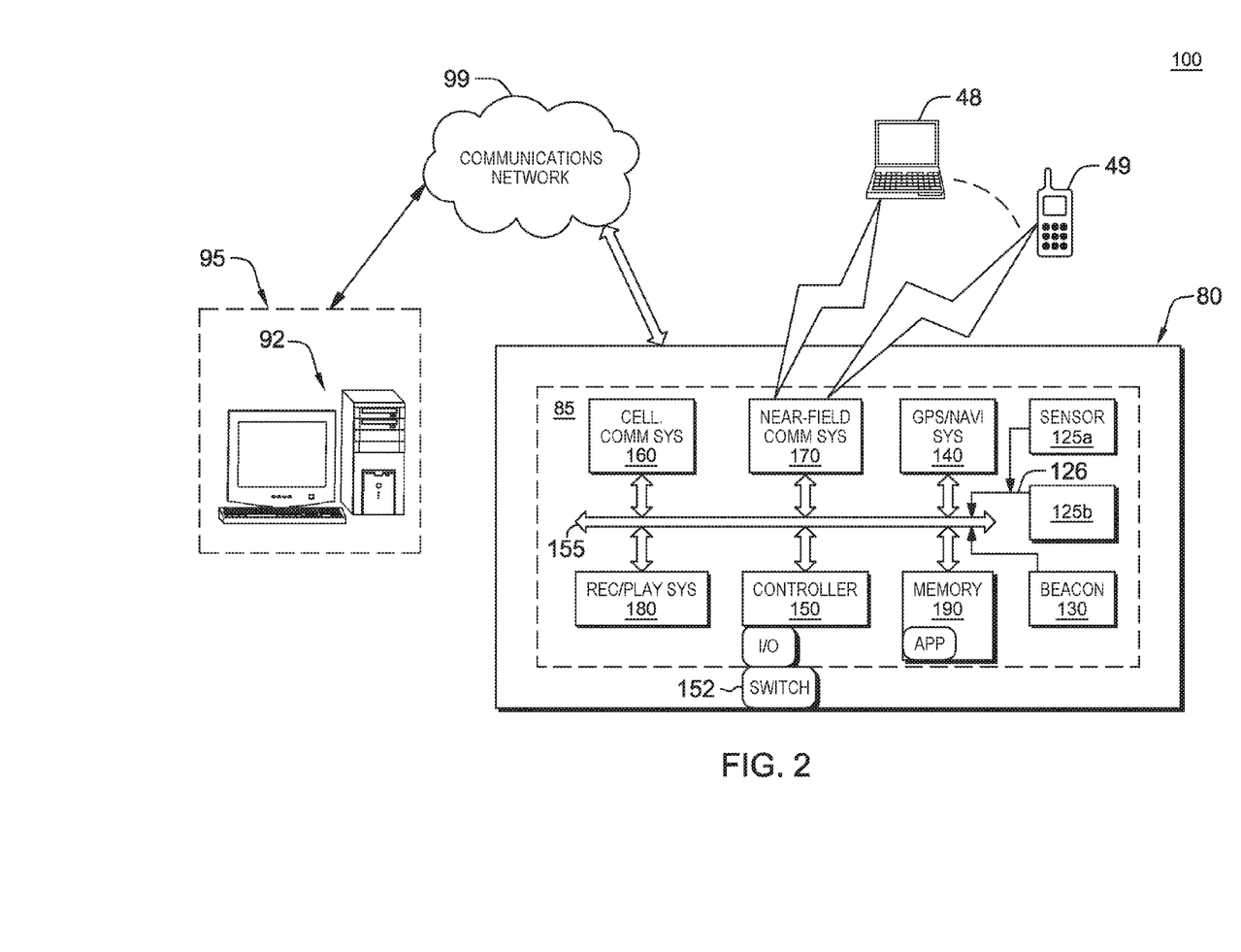
FIG. 2 shows an example of a drone having components configured for interacting with entities in the system 100 for a rescue of lost individuals according to one embodiment.

FIG. 2 shows an embodiment of the UAV 80 and associated components of the system 100 configured to provide the functionality for optimizing a rescue operation. As shown in FIG. 2, the UAV 80 is equipped with components 85 including one or more sensor devices 125a, 125b, e.g., an altimeter, or computer vision equipment, etc. A sensor 125a, 125 b may be configured to detect a situation requiring a need to rescue the individual at a current location. Example sensor devices include, but are not limited to: a heat/ temperature sensor, a chemical sensor, a bio-sensor, a pressure sensor, smoke sensor, oxygen quality sensor, an environmental air quality sensor, and/or an accelerometer. Each sensor, e.g., sensor 125b is configured to generate a trigger signal 126 upon a detecting a situation which may require a rescue operation to be performed to rescue the individual.

There is additionally provided on or at the drone 80 one or more communications systems including, for example, a transceiver for receiving flight path navigation commands, e.g., from ground or other airborne equipment, and/or for transmitting data obtained from sensors 125a, 125b, etc. to ground or other airborne equipment. Other UAV instrumentation may include for example; a flight controller/control processor 150 for use in configuring a navigation system to control the UAV to traverse a flight-path to a destination location, and a global positioning system (GPS) receiver 140, e.g., for receiving GPS signals to determine a current GPS location of said individual. In one non-limiting embodiment, the UAV's communications systems includes an on-board processor and associated memory storage device that may receive and store programmed flight path control information including instructions to navigate the drone along a pre-determined path, and including control information and commands to configure the drone to perform the rescue operations as discussed herein.

In one embodiment, the control processor 150 at the UAV is further configured to receive a trigger signal and automatically record a current GPS location of the individual and/or drone, and controlling a launching of said UAV to said destination location.

In one example, the UAV component 85 may include a communication sub-system 160, e.g., including a transceiver, radio and amplifiers suitable for UAV system communications according to any particular UAV communications platform, e.g., in cellular or radio frequency bands such as UHF, VHF, L-, S-, C-, or X-standard communications. Such equipment 160 maybe suitable for real-time communicating over a network 99, e.g., with a drone base station, a cloud based service, or a device 92 associated with a local emergency rescue authority/entity 95. A UAV component 85 may further include additional communications sub-system 170, e.g., including a transceiver, radio and amplifiers suitable for Wi-Fi standard communications and/or other near-field communications, such that the drone may communicate with a lost individual's mobile device, e.g., a laptop 48 or smart phone device 49, for real time communicating with a user. A power system (not shown) including power supplies such as batteries may be provided.

Additionally, the drone 80 may be equipped with a camera device (e.g., not shown) for capturing/communicating digital images.

In one embodiment, the drone 80 is equipped with a media recording/playback device 180 configured to record and store an audio, video, A/V or any other format message from an individual, e.g., for storage in an on-board memory storage system 190. In one embodiment, a message may be provided in advance for storage in the memory 190 and for playback from the device 180. In one embodiment, at a destination location of an emergency rescue authority/entity, the UAV is further configured to contemporaneously playback a stored recorded message for and provide the last recorded GPS location of the lost individual to an emergency response authority to inform of said individual's situation and location.

Figure 3:
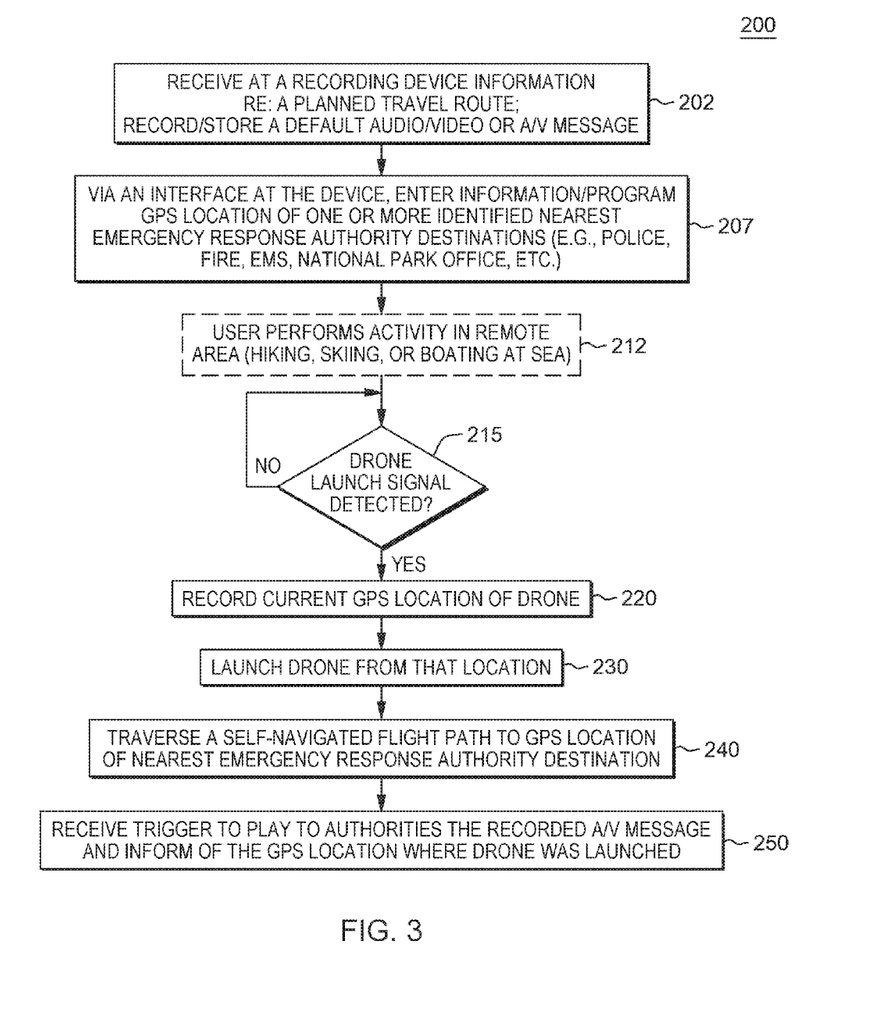
FIG. 3 shows a method implemented at a UAV control system that operates in response to received and/or programmed control and navigation commands to control the drone for rescue operations in one embodiment.

FIG. 3 depicts a methodology 200 for drone-based rescue operations according to one embodiment. As shown in FIG. 3, step 202 depicts a user programming and/or recording a message into a recording device 180 at the UAV. The recording device and memory stores the received/recorded message which may include an audio/visual or A/V message describing the individual's plan to engage in an activity and/or perhaps a planned route that the individual is to take for engaging in the activity. This planned travel route information regarding the particular information of the user activity and location the individual is to be engaged may be recorded at a recording device and/or stored in the memory storage at the drone.

Continuing at 207, via an interface to the drone GPS navigation system 140 recording device, the user may enter information indicating a pre-determined or known location of an emergency rescue authority/entity. For example, the individual to be engaged in the activity may program a GPS location of one or more identified or known nearest emergency response authority/entity destinations (e.g., a police department, a fire department, EMS, national park office, etc) where the individual is engaging in the particular activity.

As shown next at 212, there is depicted the individual engaging in an activity that may be considered "extreme" which may entail locating to a remote area, e.g., hiking, skiing, at a mountain as shown in FIG. 1 or boating at sea, for example. As described, the drone 80 may be located in proximity to the user, e.g., mounted on a backpack carried by the individual while engaging in the activity or otherwise carried in tow by the individual.

Then, as depicted in FIG. 3, step 215, a determination is made as to whether a drone emergency launch signal is detected. A drone emergency launch signal may be detected if there is an emergency situation in which it is determined that a rescue operation is required.

In one non-limiting example, the drone may detect an emergency situation by one or more sensor devices 125a, 125b requiring a need to rescue said individual at a current location. The drone may sense a condition, and generate a trigger signal in response to the detecting of a sensor signal. This may be for example, when a heat sensor, moisture sensor or accelerometer sensor is triggered, e.g., when sensing an environmental condition exceeding a limit. Once such a trigger signal is received at the drone processor, the processor will initiate the systems to automatically launch the drone to the pre-determined destination. As an example, in the case of a hiker or skier, a sudden change in elevation might be sensed as a fall, and an altimeter would provide a trigger signal to initiate the launch. Further, a drop in temperature might sense a lost skier at night with plummeting temperatures. In an example case of a boater, a water detection sensor in a dry compartment may initiate a launch and alert of a potential sinking ship and generating of an SOS signal. As a further example, an individual who is riding a vehicle, an impact sensor may be activated, for example, in response to sensing a vehicle crash, which may be used to trigger the launch.

Alternatively, the individual engaging in the activity may be equipped with a biosensor for monitoring of the individual's vital statistics (e.g. heart rate, blood pressure, etc), which may trigger communicating a wireless signal for receipt at the drone, for example, if the individual is has a heart attack or other health issue while engaging in the activity. The biosensor associated with the user may generate a signal that may be communicated from a user device, e.g., using near-field communications, to the drone. Once such a trigger signal is received at the drone, the control processor will initiate the systems to automatically launch the drone with the recorded message and destination coordinates. In one embodiment, a "wearable" sensor (e.g., biosensor) can interface and serve as a defined trigger point to dynamically provide a launch.

In a further non-limiting example, a launch signal may be detected based upon a user manually configuring the drone 80 to take-off and navigate to a pre-determined destination when in an emergency situation. For example, as shown in FIG. 2, a component 85 on the drone may include a physical switch 152 that interfaces with the controller 150 via associated input/output circuitry interfacing with the controller 150. Upon the individual's manually pressing of the switch 152, the processor will receive a trigger to automatically launch the drone.

In a further non-limiting embodiment, the UAV may directly receive from the individual at a physical switch device, or at a receiver for directly receiving from a device operated by the individual, a self-launch control signal, e.g., transmitted via Wi-Fi, Bluetooth or other near-field communications connectivity from the individual's mobile device. In this embodiment, the user's mobile device (e.g., smart phone, tablet, etc) may be equipped with an application that can communicate with the drone and initiate a launch and current GPS coordinate recordation. In this embodiment, the UAV uses its near-field communication sub-system configured to communicate with a device carried and/or operated by said individual (or a third party) via short-range and/or near field wireless communications. The drone may thus receive remotely generated commands from the individual's or a third party's voice, or third party's device via remote control wireless signals, e.g., over at a particular frequency setting.

From whatever source (sensor or manually switched), the UAV's control processor unit 150 is configured to receive the trigger signal, and via a data signal bus 155 provide the various signals to initiate the various sub-systems to launch the drone along a flight-path to the pre-determined destination.

As indicated at 220, FIG. 3, at such time as receiving the trigger signal, and/or prior to launching the drone, the processor initiates the global positioning system (GPS) receiver at the UAV is configured to receive GPS signals and determine a current GPS location of said individual and/or drone. In particular, the GPS coordinates of the individual's current location where the drone is launched may be stored in the GPS memory system.

Continuing at 230, FIG. 3, the processor then initiates the automatic launching of the drone from the individual's current location. In one embodiment, in response to receipt of said trigger signal, the processor may further configure the UAV to automatically actuate a release from any receptacle upon which the drone or UAV is mounted or carried. Then, at 240, there is depicted the control processor controlling the navigation of the drone to traverse a self-navigated flight path to a destination, i.e., associated with the prior recorded GPS location of a nearest emergency response authority.

Once arriving at the location of a nearest emergency response authority destination, at 250, FIG. 3, the processor device of the drone may then be configured to playback the prior recorded/stored audio, video or A/V message from the individual to rescue personnel and inform the emergency response authority of the last recorded GPS location where the individual was located and/or the drone was launched. In one embodiment, the drone 80 may contemporaneously provide the stored recorded message and current GPS location of said individual to one or more playback devices associated with an emergency response authority to inform of said individual's situation and location.

In one embodiment, after the drone self-navigates to programmed destination, the drone 80 beacons at the destination and plays recorded message. The rescue authorities may receive the beacon automatically in addition to the GPS location of its launch (location of lost person(s)). Referring back to FIG. 2, the drone includes a beacon component 130 which may include a radio or other signal generator, e.g., ultrasonic, optical, laser, or other types of signals that indicate the proximity or location of a device. In one embodiment, this beacon signal relates the GPS location of its launch (location of lost person(s)) and the individual's recorded message.

Figure 4:
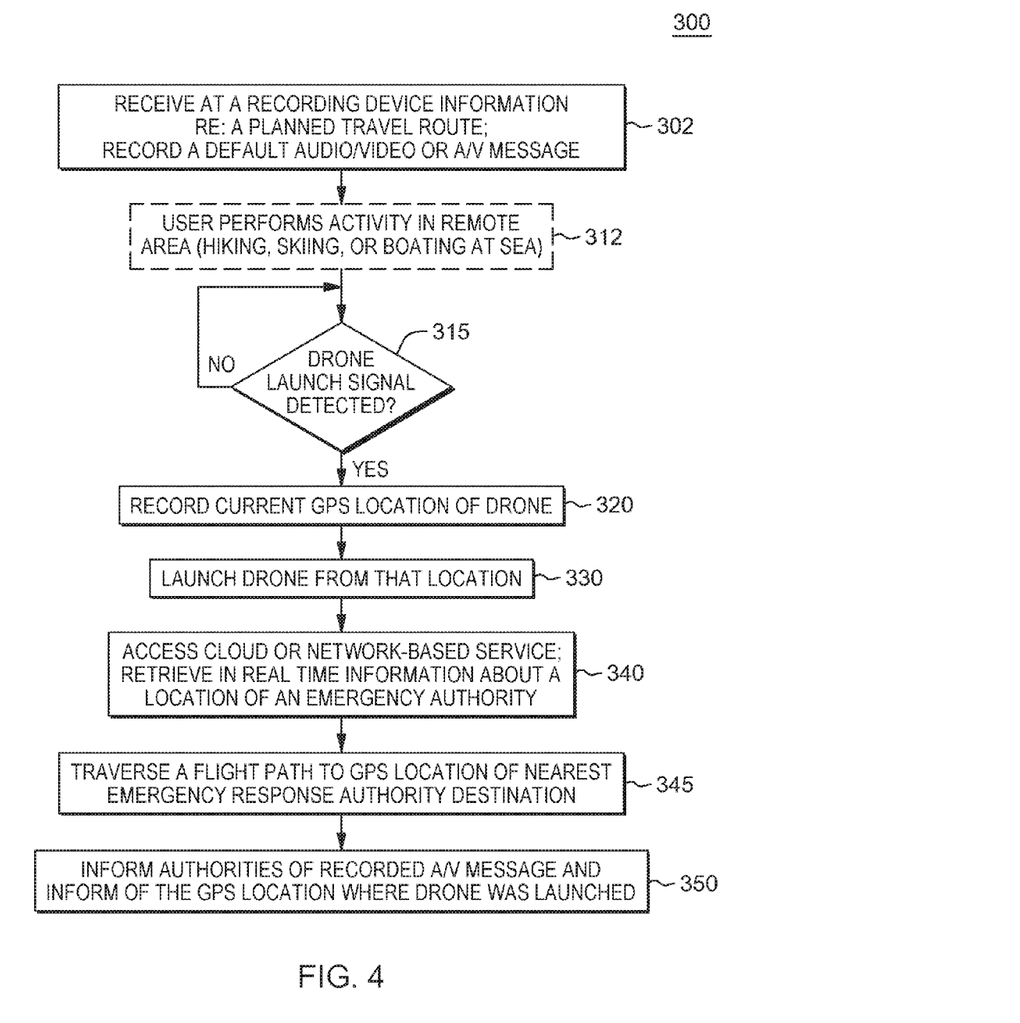
FIG. 4 depicts an alternative method implementing a drone for assisting in a rescue of lost individuals according to a further embodiment.

FIG. 4 depicts a further methodology 300 for drone-based rescue operations according to one embodiment. In this embodiment, the individual may not know in advance a location of an emergency rescue authority/entity 95. Thus, the drone 80 is configured to obtain such information in flight.

In this embodiment of FIG. 4, method 300 includes similarly to the method 200, FIG. 3: at step 302 a user programs and/or records a message into the recording device 180 at the UAV for storage that describes the individual's plan to engage in an activity and/or perhaps a planned route that the individual is to take for engaging in the activity, and/or details of a specific location.

Continuing at 312, there is depicted the individual engaging in an activity that may be considered "extreme" which may entail locating to a remote area, e.g., hiking, skiing, at a mountain as shown in FIG. 1 or boating at sea, for example. As described, the drone 80 may be located in proximity to the user, e.g., mounted on a backpack carried by the individual while engaging in the activity, or otherwise carried in tow by the individual.

Then, as depicted in FIG. 4, step 315, a determination is made as to whether a drone emergency launch signal is detected. A drone emergency launch signal may be detected if there is an emergency situation in which it is determined that a rescue operation is required.

As mentioned in connection with the method 200, the drone may detect an emergency situation by one or more sensor devices 125a, 125b requiring a need to rescue said individual at a current location. The drone may sense a condition, and generate a trigger signal in response to the detecting of a sensor signal. Alternatively, the individual engaging in the activity may be equipped with a biosensor, e.g., detecting heart/pulse rate, or a blood pressure, which may trigger communicating a wireless signal for receipt at the drone, for example, if the individual succumbs to a health issue while engaging in the activity. Alternatively, the launch signal may be detected upon a user manually configuring the drone 80 to take-off by manipulating the physical switch 152 that interfaces with the controller 150 via associated input/output circuitry. Alternatively, the UAV may directly receive from the individual at a receiver for directly receiving from a device operated by the individual, a self-launch control signal, e.g., transmitted via Wi-Fi, Bluetooth or other near-field communications connectivity from the individual's mobile device.

From whatever source (sensor or manually switched), the UAV's control processor unit 150 is configured to receive the trigger signal, and via a data signal bus 155 provide the various signals to initiate the various sub-systems to launch the drone.

As indicated at 320, FIG. 4, at such time as receiving the trigger signal, and/or prior to launching the drone, the processor initiates the global positioning system (GPS) receiver at the UAV is configured to receive GPS signals and determine a current GPS location of said individual and/or drone. In particular, the GPS coordinates of the individual's current location where the drone is launched may be stored in the GPS memory system.

Continuing at 330, FIG. 4, the processor then initiates the launching of the drone from the individual's current location. Then, at 340, there is depicted the control processor controlling the navigation of the drone to traverse a flight path to a currently unknown destination.

Continuing to 340, FIG. 4, given that a destination location are both unknown at a time of the launching of said UAV, then while in flight, the control processor initiates the UAV's cellular communications sub-system to a cloud-based service over network 99 in order to retrieve in real-time, any information about a location of an emergency authority/entity in the proximity of the individual. In one embodiment, the on-board communications sub-system initiates a cellular phone network communication, or the communications sub-system further may, after the UAV launching, monitor for cellular network signal strength, and navigate said UAV to stay within an area of sufficient cellular phone coverage strength to initiate a cellular phone communications.

Thus, the UAV's communications sub-system is configured to establish a network connection over a communications network and access information over the communications network via a network connection. This information obtained may be phone contact numbers or actual address locations for any of the one or more emergency rescue authority/entity locations. Based on the locations/addresses, the latitude/longitude coordinates or GPS coordinates are determinable by functionality programmed into the drone. Thus, after launching the drone, the control processor employs the first communications sub-system to receive over a network connection information including one or more GPS location coordinates associated with each of one or more destination locations having an emergency response capability, and in response, generate from the received or otherwise determined GPS location coordinates, a flight-path to enable the UAV to navigate to the nearest destination location.

Alternatively, or in addition, once equipped with addresses and/or phone numbers of emergency authority/entity, the UAV may utilize the communications sub-System to generate and transmit an emergency call to the one or more emergency response authority destinations. During the call, any pre-recorded audio message stored by the individual on the drone may be transmitted/played-back with the user's location along with the GPS coordinates of the lost individual's location.

Otherwise, returning to 345, FIG. 4, responsive to receiving information such as actual GPS location coordinates of a destination location, the control processor generates a flight-path to navigate the UAV to that destination location.

Once arriving at the location of a nearest emergency response authority destination, at 350, FIG. 4, the control processor of the drone may then be configured to playback the prior recorded/stored audio, video or A/V message from the individual to rescue personnel and inform the emergency response authority of the last recorded GPS location where the individual was located and/or the drone was launched. In one embodiment, the drone 80 may contemporaneously provide the stored recorded message and current GPS location of said individual to one or more playback devices associated with an emergency response authority to inform of said individual's situation and location.

Alternatively, after the drone self-navigates to the programmed destination, the drone 80 beacons at the destination and plays recorded message. The rescue authorities may receive the beacon automatically in addition to the GPS location of its launch (location of lost person(s)) and initiate a rescue operation(s).

In one embodiment, the UAV may be programmed to re-trace its path to the launch point the drone took off from. Thus, as part of any rescue operation initiated responsive to the drone beacon at 250, FIG. 3 or 350, FIG. 4, the drone may be re-trace its path to the launch point such that the emergency response authority personnel could follow the drone. This could be done either from the emergency response authority location or at some point nearer the lost person (e.g. at a trail head).

A first example scenario regarding use of the lost person rescue drone is provided. A setup phase includes an individual/user entering a planned travel route (hiking, boating, skiing, etc) into the drone. The user identifies and programs GPS location of one or more nearest emergency response authority (e.g., police, fire, EMS, national park office, a coast guard, or other emergency personnel). When an emergency situation occurs: the user may manually activate power the drone and then record a new audio/video or A/V message, or even keeps the prior recorded message. Then, the user launches the drone utilizing pre-programmed emergency response authority destination (e.g., user either selects nearest or drone GPS system automatically determines). The drone responsively self-navigates to the programmed destination and when arriving at the programmed destination, the drone beacons and plays the recorded message (e.g., either automatically or by manual manipulation of a button located on the drone from which the recorded message may be played back along with GPS location of its launch (location of lost person(s)).

A second example scenario regarding use of the lost person rescue drone is provided. A setup phase includes an individual/user entering a planned travel route (hiking, boating, skiing, etc) into the drone. For example, the hiker or lost individual may pre-program/record their hiking route and record key information about trails, routes, and conditions they face.

This information can be utilized by the GPS mapping system (not shown) at the drone to provide relevant information to authorities including but not limited to a planned path of individual/group and determination of nearest authority to navigate to (which may vary as user hikes from one location to another). The user identifies and programs GPS location of one or more nearest emergency response authority (police, fire, EMS, national park office, etc). The user thus identifies one or more emergency response authorities that could be the recipient of the drone in the case of an emergency.

In this example, the hiker or lost individual may carry his/her own personal rescue drone that can record and then relay any critical or contextual information. That is, the hiker or lost individual themselves and the information they provide is pivotal to the rescue efforts as the information is a trigger rendering the drone pro-active. The hiker or lost individual to be found is by a drone they deploy with critical information related to their unique situation. For example, the lost individual may communicate a recorded video message that that may mention any current medical situation of that user and will be deployed to the drone and taken into account in the subsequent rescue effort. The lost individual can pre-record route and trail information prior to hiking and provide updated information, video, and medical data just prior to the launch of their own rescue drone.

The actual location that the drone is dispatched to is selected either by the user or automatically. The user records a default message that will be utilized if drone is automatically launched. This recorded message is what will be delivered (along with launch GPS locations) when the drone reaches the emergency response authority. This may include information such as, but not limited to: the person(s) name and static vitals (e.g., blood type, contact info, next of kin, etc.).

Then, if an emergency situation occurs, the drone may be manually activated by the user, e.g., by activating drone power. The user, if he/she is physically able, may decide to enter a further message, i.e., record a new message or keep the original recorded message. This provides the user the opportunity to add information such as descriptive location information (e.g., "I'm 50 meters off the trail near the cliff wall"), as well as current health issues (e.g. "I believe I've broken my leg"). The user may then launch the drone utilizing pre-programmed emergency response authority destination (user either selects the nearest location or the drone's GPS system automatically determines). For example, the drone's GPS mapping and navigation system will select the nearest response authority destination based upon known methods of mapping shortest path routes to one of the pre-programmed response authority destinations. The drone will then self-navigate to the programmed destination. Upon arrival at the response authority destination, the drone may land or hover and begin to beacon in using methods such as audible beeps, flashing lights, etc. to draw attention to the unit. The drone can either automatically begin playback of the recorded message(s) or these can be initiated by someone that finds the drone thru a physical button press.

With respect to the ability of the UAV to self launch, generally, the method steps include, but are not limited to: 1) detecting emergency conditions, 2) activating launch sequence, and 3) navigating to pre-program response authority destination. With respect to detecting an emergency situation, these methods are based on the location and activity the user is engaged. For example, while on a boat, a severe emergency situation of the boat may be determined by gyroscopes on the drone or water level in hull of the boat (a trigger based on and communicated by a remote sensor) monitored by the drone. In another example, the drone is attached to backpack, and auto-launched, for example, if the accelerometer exceeds pre-defined speed or impact detected. Alternatively, the drone may include an over-ride option before launch initiated.

In one example scenario, subsequent to notifying and dispatch of any emergency rescue authority/entity, an emergency response authority destination or their proxies (dispatched rescue personnel) could send a beacon on a publicized frequency that dispatched drones could use as a homing location. Further drone devices could automatically tune to that particular channel and automatically route to the source signal or to broadcasted GPS coordinates. Thus, the method enables the drone to track already dispatched rescue personnel.

Further, using the drone's equipped cellular (or other network) connectivity hardware that allows them to monitor for network signal strength and when in coverage, the drone could hover (to prevent going in and out of coverage) and place an emergency call to the one or more emergency response authority destinations. Upon call connection, the recorded message(s) would be delivered. This could include playing a preamble message, e.g., "This is an emergency request for assistance that was pre-recorded and being delivered by a drone in route to this emergency response authority destination." Other relevant information could also be delivered using text-to-speech systems (not shown) that could relay the launch location and current drone location GPS coordinates. Thus, the system 100 provides for an earlier dispatch of emergency personnel and ability to extend the coverage of the drone in case the distance to be traveled is beyond the battery capability of the drone.

Either in combination with above additional embodiment or just the main embodiment, the drone could be programmed to re-trace its path to the launch point such that the emergency response authority personnel could follow the drone. This could be done either from the emergency response authority location or at some point nearer the lost person (e.g. at a trail head).

In this disclosure, the drone might be deployed to find a lost hiker, however, may never receive beforehand, instructions as to where to look. In one embodiment, for example, the hiker or any lost individual may provide the information and the information they provide is pivotal to the rescue efforts. The drone is configured to react to receipt of such information and respond pro-actively to find the hiker or lost individual by a drone they deploy with critical information related to their unique situation.

The hiker or lost individual can communicate and inform of key context information pertaining to their particular situation, e.g., that lost user's leg is broken, or the lost user had fallen about 30 feet off a west facing cliff and that the user can see the sunset right now. In one example scenario, if a hiker "fell" and does not have a working cell phone or phone's battery is dead, the rescue drone could still work and be able to relay the correct information back to rescue authorities regarding the location and current unique situation.

Thus, the approach of the method and system herein is a very distinctive use case for a lost hiker that is requesting assistance that is entirely based on the process of that user providing information regarding their unique situation and communicating this key information back to authorities.

In a further embodiment, the present disclosure provides a drone rescue system and method that may operate independently without any expensive nodes, base stations or RFID tags, and maintains freedom without a formal deployment of a mesh network. The drone rescue system allows the user to send for help without waiting for someone to come and find them once they are lost. It thereby allows the hiker/lost person to self-initiate a self rescue effort and allows the lost person to provide critical, timely, information about their situation that may save their life.

The approach described herein involves the use of a hiker initiating their own rescue effort prior to anyone knowing they are even lost. Time is critical within rescue situations and the methods employed would allow for immediate deployment from the hiker themselves.

Figure 5:
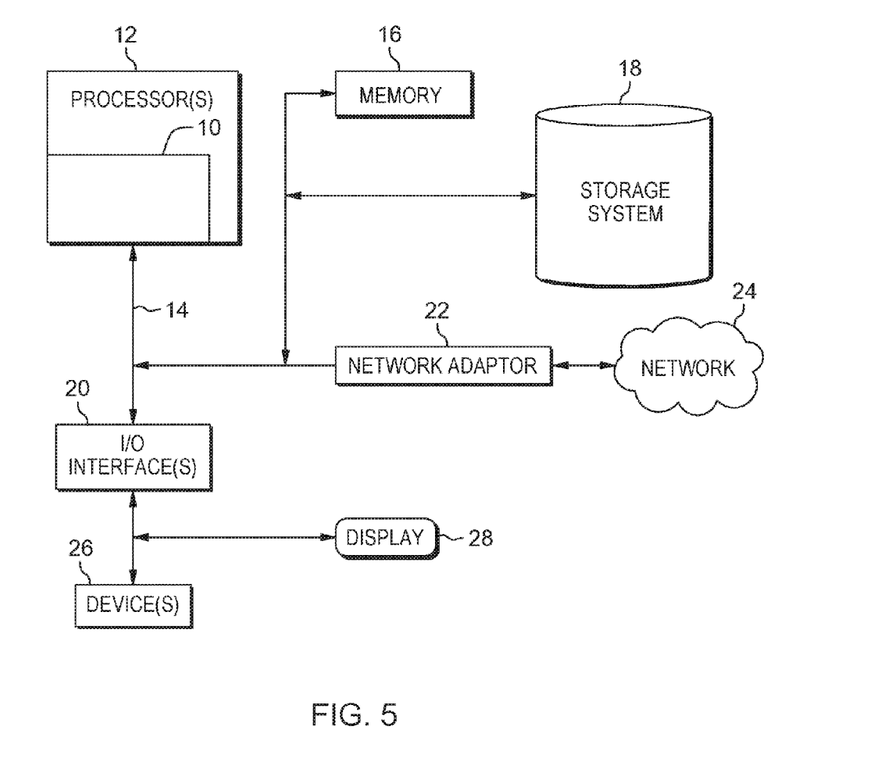
FIG. 5 depicts an exemplary hardware configuration for performing methods such as described herein.

FIG. 5 illustrates a schematic of an example computer or processing system that the drone is configured with to assist in the detection, and operations involved in rescuing lost individuals or groups in the embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. An analytics framework module 10 having instructions employing the methods herein may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, and external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only, and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A drone based rescue system comprising:
an unmanned aerial vehicle (UAV) associated with and at a physical location in proximity to an individual while said individual is engaging in an activity, said UAV comprising:
one or more sensor devices configured to detect a situation requiring a need to rescue said individual at a current location, and configured to generate a trigger signal in response to detecting the situation;

a recording device configured to record and store a message from the individual;

a global positioning system (GPS) receiver for receiving GPS signals to determine a current GPS location of said individual;

a navigation system configured to control said UAV to traverse a flight-path to a destination location;

a processor unit at said UAV configured to receive said trigger signal and automatically record a current GPS location of said individual and controlling a launching of said UAV from the physical location proximate said user to said destination location, wherein said UAV is further configured to contemporaneously provide said stored recorded message and current GPS location of said individual to an emergency response authority to inform of said individual's situation and location, said stored and recorded message being selected from a group consisting of: an audio message, a video message, an audio-video formatted message, and text and image data messages, said UAV further comprising:

one or more media playback devices for playback of said stored and recorded message.

2. The system of claim 1, wherein said UAV is mounted to a receptacle carried by the individual while engaging in said activity, and in response to receipt of said trigger signal, said processor unit is further configured to:

automatically actuate a release of said UAV from said receptacle and automatically initiate the launching of said UAV to navigate along the flight-path.

3. The system of claim 1, wherein said UAV is carried by the individual while engaging in said activity, said UAV comprising a physical switch device or a near-field RF communications receiver for receiving directly from the individual or directly from a device operated by the individual, a self-launch control signal; and in response to receipt of the self-launch control signal, said UAV being configured to initiate the launch of the UAV and enable said UAV to navigate along the flight-path to said destination.

4. The system of claim 1, wherein said destination location and said flight-path to said destination location are both pre-determined, said navigation system configured to use GPS information providing said UAV with ability to navigate a pre-programmed path to said destination location.

5. The system of claim 1, wherein said flight-path to said destination location are both unknown at a time of the launching of said UAV, said UAV further comprising:

a first communications sub-system configured to establish a network connection over a communications network and access information over the communications network via a network connection, wherein after said launching, said processor unit is further configured to:

employ the first communications sub-system to receive over said network connection information including one or more GPS location coordinates associated with each of one or more destination locations having an emergency response capability, and generate responsive to said accessed GPS location coordinates a fight-path to enable said UAV to navigate to one of said destination locations.

6. The system of claim 5, wherein said communications sub-system is adapted to communicate said recorded message to a receiving device via the communications network.

7. The system of claim 6, wherein said first communications sub-system enables cellular phone network communications, said first communications sub-further configured to:

after said UAV launching, monitor for cellular network signal strength, and navigate said UAV to stay within an area of sufficient cellular phone coverage strength and initiate a cellular phone emergency call to the one or more emergency response authority destinations; and upon connection to a receiver device at said emergency response authority destination, playback said recorded message contemporaneous with said individual's current GPS location.

8. The system of claim 1, wherein said UAV further comprises:

a second communication sub-system configured to communicate with a device carried and/or operated by said individual or a third party via short-range and/or near field wireless communications, said second communications sub-system further configured to:

receive remote-commands from said individual or a third party via remote control wireless signals over at a particular frequency setting.

9. The system of claim 1, wherein said at least one sensor configured to detect an event is selected from a group consisting of:

a biosensor configured to generate the trigger signal upon detecting a biological condition associated with said individual;

an accelerometer configured to generate the trigger signal upon detecting a kinetic condition of said individual, said UAV or both said individual and UAV, and a thermal sensor configured to generate the trigger signal upon detecting an environmental temperature condition.

10. A method for optimizing a rescue operation of an individual engaged in an activity comprising:

maintaining, by an individual engaged in an activity, an unmanned aerial vehicle (UAV) associated with and at a physically location in proximity to said individual while said individual is engaging in an activity, recording by a recording device at said UAV a message from an individual, and storing said message in a storage device for subsequent playback;

detecting, at one or more sensor devices, a situation requiring a need to rescue said individual at a current location, and generating a trigger signal in response to said detecting, said UAV having a control processor unit configured to receive said trigger signal, determining, by a global positioning system (GPS) receiver adapted to receive GPS signals at said UAV to determine a current GPS location of said individual;

wherein, responsive to receipt of said trigger signal, said control processor unit automatically recording a current GPS location of said individual and controlling a launching of said UAV from the physical location proximate said user to a destination location, said control processing unit controlling a navigating of said UAV to traverse a flight-path to said destination location, and contemporaneously providing said stored recorded message and current GPS location of said individual to an emergency response authority to inform of said individual's situation and location, wherein said stored and recorded message is selected from a group consisting of: an audio message, a video message, an audio-video formatted message and/or text and image data messages, said UAV playing said stored and recorded message via one or more media playback devices.

11. The method of claim 10, wherein said UAV is carried by the individual while engaging in said activity, said method further comprising:
   receiving, at the UAV, directly from the individual at a physical switch device, or at a receiver for directly receiving from a device operated by the individual, a self-launch control signal, and
   in response to receipt of the self-launch control signal, initiating said launching of the UAV and enabling said UAV to navigate along the flight-path to said destination.

12. The method of claim 10, wherein said UAV is mounted to a receptacle carried by the individual while engaging in said activity, wherein said method further comprises:
   in response to receipt of said trigger signal, configuring said UAV to automatically actuate a release from said receptacle and automatically initiate the launching of said UAV to navigate along the flight-path.

13. The method of claim 10, wherein said destination location and said flight-path to said destination location are both pre-determined, said method further comprising:
   configuring said navigation system to use GPS information to navigate said UAV to a pre-programmed path to said destination location.

14. The method of claim 10, wherein said flight-path to said destination location are both unknown at a time of the launching of said UAV, said method further comprising:
   configuring a first communications sub-system to establish a network connection over a communications network and access information over the communications network via a network connection, wherein after said launching, said method further comprises:
   receiving via the first communications sub-system information including one or more GPS location coordinates associated with each of one or more destination locations having an emergency response capability, and responsive to said accessed GPS location coordinates information generating a fight-path to enable said UAV to navigate to one of said destination locations.

15. The method of claim 14, further comprising:
   configuring said first communications sub-system to communicate said recorded message to a receiving device via the communications network.

16. The method of claim 15, wherein said first communications sub-system enables cellular phone network communications, said method further comprising:
   monitoring for a cellular network signal strength, and navigating said UAV to stay within an area of sufficient cellular phone coverage strength and initiating a cellular phone emergency call to the one or more emergency response authority destinations; and
   upon connection to a receiver device at said emergency response authority destination, playback said recorded message contemporaneous with said individual's current GPS location.

17. The method of claim 10, further comprising:
   configuring a second communications sub-system to communicate with a device carried and/or operated by said individual or a third party via a short-range and/or near field wireless communication links, and receive from said device remote-commands from said individual or a third party via remote control wireless signals over at a particular frequency setting.

18. The method of claim 10, wherein said sensor device is selected from a group consisting of:
   a biosensor configured to generate the trigger signal upon detecting a biological condition associated with said individual;
   an accelerometer configured to generate the trigger signal upon detecting a kinetic condition of said individual, said UAV or both said individual and UAV, or
   a thermal sensor configured to generate the trigger signal upon detecting an environmental temperature condition.

* * * * *